United States Patent
Yokoo (10) Patent No.: US 11,442,349 B2
(45) Date of Patent: Sep. 13, 2022

(54) WAVELENGTH CONVERSION ELEMENT, METHOD OF MANUFACTURING WAVELENGTH CONVERSION ELEMENT, LIGHT SOURCE DEVICE, AND PROJECTOR

(71) Applicant: SEIKO EPSON CORPORATION, Tokyo (JP)

(72) Inventor: Tomohiro Yokoo, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 51 days.

(21) Appl. No.: 17/154,633

(22) Filed: Jan. 21, 2021

(65) Prior Publication Data

US 2021/0223672 A1    Jul. 22, 2021

(30) Foreign Application Priority Data

Jan. 22, 2020  (JP) .............................. JP2020-008513

(51) Int. Cl.
    *G03B 21/20* (2006.01)

(52) U.S. Cl.
    CPC .................................. *G03B 21/204* (2013.01)

(58) Field of Classification Search
    CPC .................................................... G03B 21/204
    See application file for complete search history.

(56) References Cited

U.S. PATENT DOCUMENTS

| | | |
|---|---|---|
| 2008/0315351 A1 | 12/2008 | Kakehata |
| 2010/0092788 A1 | 4/2010 | Naito et al. |
| 2010/0151231 A1 | 6/2010 | Matsuo et al. |
| 2010/0237458 A1 | 9/2010 | Kakehata |
| 2010/0323192 A1 | 12/2010 | Matsuo et al. |
| 2010/0323193 A1 | 12/2010 | Matsuo et al. |
| 2011/0149549 A1 | 6/2011 | Miyake |
| 2012/0044558 A1 | 2/2012 | Kansaku |
| 2015/0103319 A1 | 4/2015 | Miyabara et al. |
| 2018/0231880 A1 | 8/2018 | Masuda |
| 2019/0041732 A1 | 2/2019 | Takagi et al. |
| 2019/0041733 A1 | 2/2019 | Takagi et al. |
| 2019/0294033 A1 | 9/2019 | Yokoo et al. |

FOREIGN PATENT DOCUMENTS

| | | |
|---|---|---|
| CN | 102375288 A | 3/2012 |
| JP | 2009-027150 A | 2/2009 |
| JP | 2009-035719 A | 2/2009 |
| JP | 2009-258404 A | 11/2009 |
| JP | 2010-095594 A | 4/2010 |

(Continued)

*Primary Examiner* — Vip Patel
(74) *Attorney, Agent, or Firm* — Dority & Manning, P.A.

(57) ABSTRACT

A wavelength conversion element includes: a wavelength conversion layer that is formed with a plurality of pores and that is excited by light in a first wavelength band to generate light in a second wavelength band different from the light in the first wavelength band; a first bonding layer formed at a first surface of the wavelength conversion layer; a second bonding layer bonded to the first bonding layer; and a reflection member that is formed at the second bonding layer and that reflects the light in the first wavelength band or the light in the second wavelength band. The first surface of the wavelength conversion layer is formed with a recess. A part of the first bonding layer is formed at the recess. The second bonding layer is formed to cover the recess. The first bonding layer and the second bonding layer are plasma polymerized films.

16 Claims, 8 Drawing Sheets

(56) References Cited

FOREIGN PATENT DOCUMENTS

| | | |
|---|---|---|
| JP | 2010-107680 A | 5/2010 |
| JP | 2010-113056 A | 5/2010 |
| JP | 2011-129354 A | 6/2011 |
| JP | 2012-220908 A | 11/2012 |
| JP | 2015-079079 A | 4/2015 |
| JP | 2016-066764 A | 4/2016 |
| JP | 2018-132549 A | 8/2018 |
| JP | 2018-136511 A | 8/2018 |
| JP | 2019-028386 A | 2/2019 |
| JP | 2019-028430 A | 2/2019 |
| JP | 2019-045552 A | 3/2019 |
| JP | 2019-164258 A | 9/2019 |

WAVELENGTH CONVERSION ELEMENT, METHOD OF MANUFACTURING WAVELENGTH CONVERSION ELEMENT, LIGHT SOURCE DEVICE, AND PROJECTOR

The present application is based on, and claims priority from JP Application Serial Number 2020-008513, filed Jan. 22, 2020, the disclosure of which is hereby incorporated by reference herein in its entirety.

BACKGROUND

1. Technical Field

The present disclosure relates to a wavelength conversion element, a method of manufacturing a wavelength conversion element, a light source device, and a projector.

2. Related Art

For example, JP-A-2018-136511 and JP-A-2011-129354 disclose an illumination device using fluorescence.

In the illumination device in JP-A-2018-136511, a wavelength conversion element in which a temperature rise of a phosphor is prevented by chemically bonding a phosphor and a support member that supports the phosphor and improving thermal conductivity from the phosphor to the support member. In the illumination device in JP-A-2011-129354, a reflection type wavelength conversion element is used in which a reflection member is provided between a phosphor and a support substrate, and fluorescence generated by the phosphor is reflected by the reflection member and emitted to the outside.

Since it is difficult to apply the chemical bonding disclosed in JP-A-2018-136511 to the reflection type wavelength conversion element disclosed in JP-A-2011-129354, adhesion between the reflection member and the phosphor is reduced, and the reflection member may be peeled off from the phosphor.

SUMMARY

In order to solve the above problems, according to a first aspect of the present disclosure, a wavelength conversion element is provided. The wavelength conversion element includes: a wavelength conversion layer that is formed with a plurality of pores and that is excited by light in a first wavelength band to generate light in a second wavelength band different from the light in the first wavelength band; a first bonding layer formed at a first surface of the wavelength conversion layer; a second bonding layer bonded to the first bonding layer; and a reflection member that is formed at the second bonding layer and that reflects the light in the first wavelength band or the light in the second wavelength band. The first surface of the wavelength conversion layer is formed with a recess. A part of the first bonding layer is formed at the recess. The second bonding layer is formed to cover the recess. The first bonding layer and the second bonding layer are plasma polymerized films.

According to a second aspect of the present disclosure, a method of manufacturing a wavelength conversion element is provided. The method includes: a preparation step of preparing a wavelength conversion layer that has a plurality of pores, a first surface, and a recess formed at the first surface and that is excited by light in a first wavelength band to generate light in a second wavelength band different from the light in the first wavelength band; a first step of forming a first bonding layer at the first surface of the wavelength conversion layer; a second step of forming a reflection member at a second surface of a substrate; a third step of forming a second bonding layer at the reflection member; a fourth step of applying energy to the first bonding layer and the second bonding layer; a fifth step of pressing the first bonding layer and the second bonding layer, and bonding the first bonding layer and the second bonding layer so that the recess is covered by the second bonding layer; and a sixth step of separating the reflection member and the substrate. In the first step, a part of the first bonding layer is formed in the recess.

According to a third aspect of the present disclosure, a light source device is provided. The light source device includes: the wavelength conversion element according to the first aspect and a light source that emits the light in the first wavelength band toward the wavelength conversion element.

According to a fourth aspect of the present disclosure, a projector is provided. The projector includes: the light source device according to the third aspect, a light modulation device that forms image light by modulating light from the light source device according to image information, and a projection optical system that projects the image light.

DESCRIPTION OF EXEMPLARY EMBODIMENTS

Hereinafter, embodiments of the present disclosure will be described in detail with reference to the drawings.

In the drawings used in the following description, in order to make the features easier to understand, the features may be enlarged for convenience, and the dimensional ratios of the constituent elements or the like may not be the same as the actual ones.

An example of a projector according to the present embodiment will be described.

Figure 1:
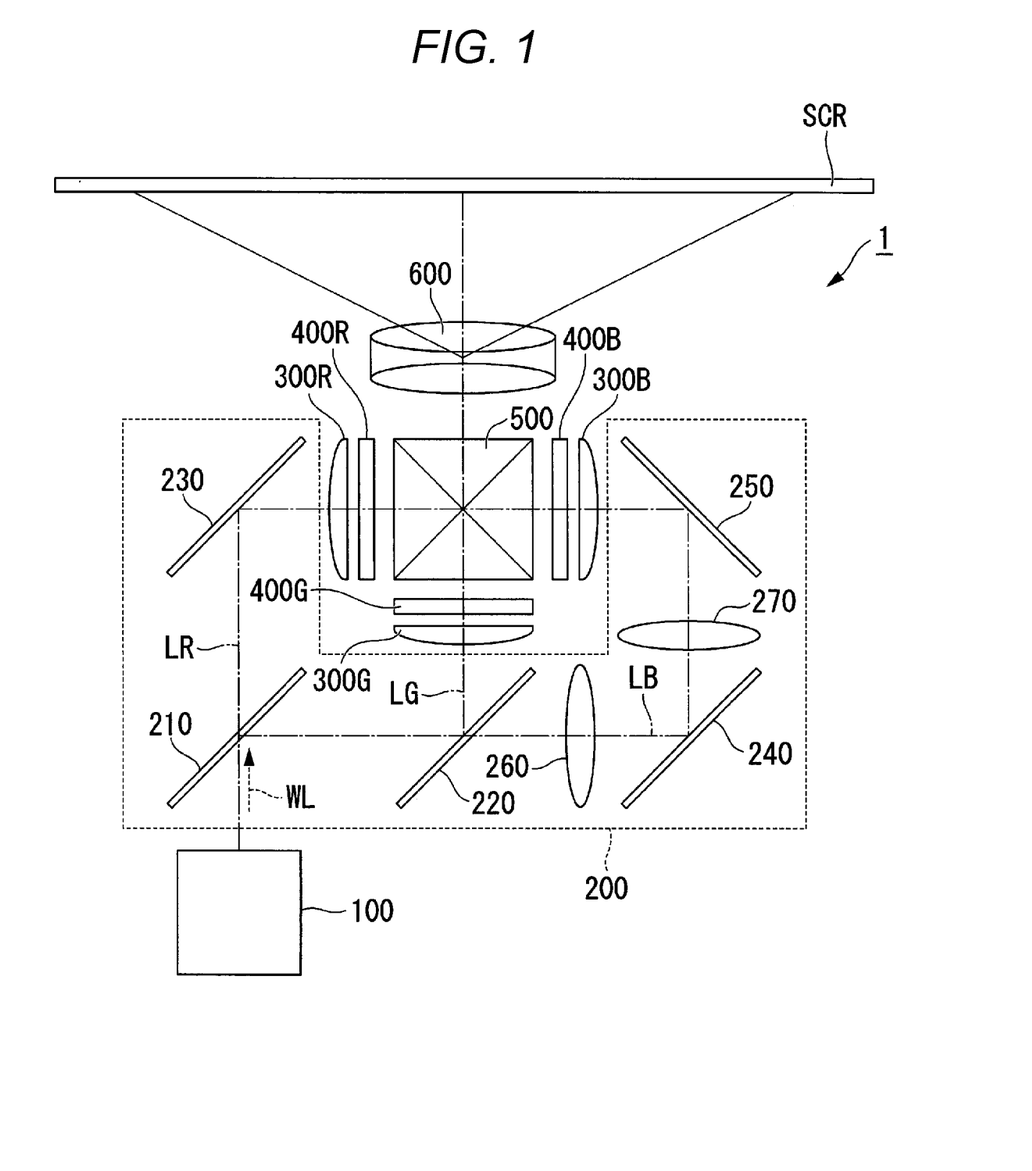
FIG. 1 is a diagram showing an outline of a projector.

FIG. 1 is a schematic diagram showing a configuration of the projector according to the present embodiment.

As shown in FIG. 1, a projector 1 according to the present embodiment is a projection type image display device that displays a color image on a screen SCR.

The projector 1 includes an illumination device 100, a color separation light guide optical system 200, light modulation devices 400R, 400G, 400B, a cross dichroic prism 500, and a projection optical system 600.

In the present embodiment, the illumination device 100 emits white illumination light WL toward the color separation light guide optical system 200.

The color separation light guide optical system 200 includes dichroic mirrors 210, 220, reflection mirrors 230, 240, 250, and relay lenses 260, 270. The color separation light guide optical system 200 separates the illumination light WL from the illumination device 100 into red light LR, green light LG, and blue light LB, and guides the red light LR, the green light LG, and the blue light LB to the corresponding light modulation devices 400R, 400G, 400B, respectively.

Field lenses 300R, 300G, 300B are disposed between the color separation light guide optical system 200 and the light modulation devices 400R, 400G, 400B.

The dichroic mirror 210 is a dichroic mirror that passes a red light component and reflects a green light component and a blue light component.

The dichroic mirror 220 is a dichroic mirror that reflects the green light component and passes the blue light component.

The reflection mirror 230 is a reflection mirror that reflects the red light component.

The reflection mirrors 240, 250 are reflection mirrors that reflect the blue light component.

The red light LR passing through the dichroic mirror 210 is reflected by the reflection mirror 230, passes through the field lens 300R, and is incident on an image formation region of the light modulation device 400R for red light.

The green light LG reflected by the dichroic mirror 210 is further reflected by the dichroic mirror 220, passes through the field lens 300G, and is incident on an image formation region of the light modulation device 400G for green light.

The blue light LB reflected by the dichroic mirror 210 transmits the dichroic mirror 220, passes through the relay lens 260, the reflection mirror 240, the relay lens 270, the reflection mirror 250, and the field lens 300B, and is incident on an image formation region of the light modulation device 400B for blue light.

The light modulation devices 400R, 400G, 400B modulate the incident color light in accordance with image information to form a color image corresponding to each color light. Although not shown, an incident side polarization plate is disposed between each of the field lenses 300R, 300G, 300B and a respective one of the light modulation devices 400R, 400G, 400B, and an emission side polarization plate is disposed between each of the light modulation devices 400R, 400G, 400B and the cross dichroic prism 500.

The cross dichroic prism 500 is an optical element that combines the image light emitted from the light modulation devices 400R, 400G, 400B to form a color image.

The cross dichroic prism 500 has a substantially square shape in a plan view in which four right-angle prisms are bonded together, and a dielectric multilayer film is formed at a substantially X-shaped interface where the right-angle prisms are bonded together.

The color image emitted from the cross dichroic prism 500 is enlarged and projected by the projection optical system 600 to form an image on a screen SCR.

Figure 2:
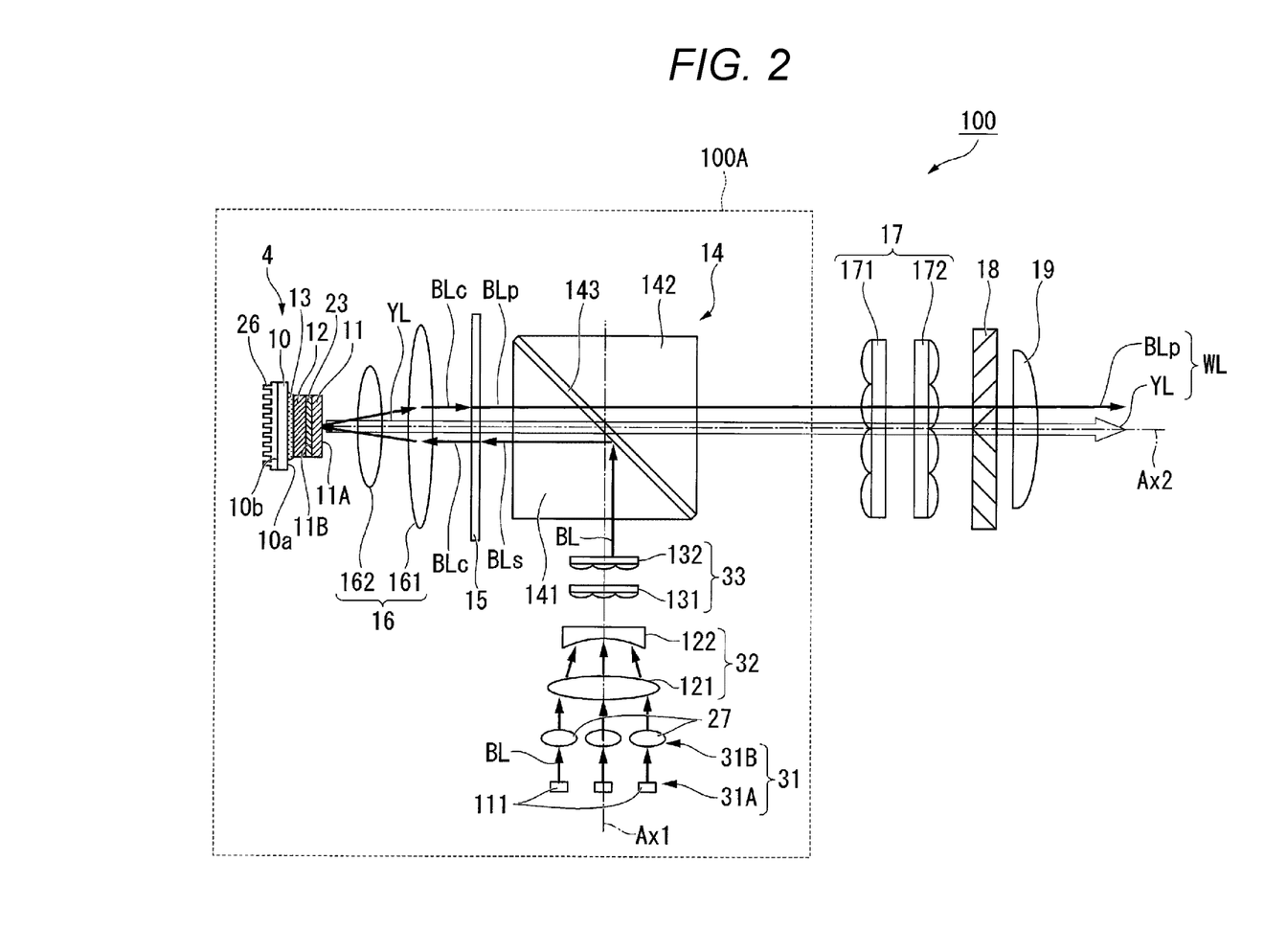
FIG. 2 is a diagram showing an outline of an illumination device.

FIG. 2 is a schematic view showing a configuration of the illumination device 100.

The illumination device 100 emits the illumination light WL toward the color separation light guide optical system 200 as described above. As shown in FIG. 2, the illumination device 100 includes a light source device 100A, an integrator optical system 17, a polarization conversion element 18, and a superimposing lens 19. The light source device 100A includes a light source unit (a light source) 31, an afocal optical system 32, a homogenizer optical system 33, a light separation and combination device 14, a retardation plate 15, a pickup optical system 16, and a wavelength conversion element 4. The light source unit 31 includes an array light source 31A and a collimator optical system 31B.

The array light source 31A of the light source unit 31 includes a plurality of semiconductor lasers 111.

Specifically, the array light source 31A is formed by arranging the plurality of semiconductor lasers 111 in an array in a plane orthogonal to an illumination optical axis Ax1 of a light beam emitted from the array light source 31A. As will be described in detail later, when an illumination optical axis of the light beam reflected by the wavelength conversion element 4 is Ax2, the illumination optical axis Ax1 and the illumination optical axis Ax2 are orthogonal to each other. On the illumination optical axis Ax1, the light source unit 31, the afocal optical system 32, the homogenizer optical system 33, and the light separation and combination device 14 are disposed side by side in this order.

On the other hand, on the illumination optical axis Ax2, the wavelength conversion element 4, the pickup optical system 16, the retardation plate 15, the optical separation and combination device 14, the integrator optical system 17, the polarization conversion element 18 and the superimposing lens 19 are disposed side by side in this order in a traveling direction of a fluorescence YL to be described later.

The semiconductor lasers 111 constituting the array light source 31A emits, for example, blue light BL which has a peak wavelength in a wavelength range of 440 nm to 480 nm. The blue light BL emitted from the semiconductor laser 111 is coherent linearly polarized light, and is emitted in parallel to the illumination optical axis Ax1 toward the light separation and combination device 14. In the present embodiment, the blue light BL corresponds to "light in a first wavelength band".

The array light source 31A matches a polarization direction of the blue light BL emitted from each semiconductor laser 111 with a polarization direction of a polarized light component (for example, an S-polarized light component) reflected by a light separation and combination layer 143 of the light separation and combination device 14. The blue light BL emitted from the array light source 31A is incident on the collimator optical system 31B.

The collimator optical system 31B converts the blue light BL emitted from the array light source 31A into parallel light. The collimator optical system 31B includes, for example, a plurality of collimator lenses 27 disposed in an array corresponding to the semiconductor lasers 111. The blue light BL converted into the parallel light by passing through the collimator optical system 31B is incident on the afocal optical system 32.

The afocal optical system 32 adjusts a light beam diameter of the blue light BL incident from the collimator optical system 31B. The afocal optical system 32 includes a lens 121 and a lens 122. The blue light BL whose light beam diameter is adjusted by passing through the afocal optical system 32 is incident on the homogenizer optical system 33.

The homogenizer optical system 33 uniformizes illuminance distribution of the blue light BL in cooperation with the pickup optical system 16 described later. The homogenizer optical system 33 includes a pair of multi-lens arrays 131, 132. The blue light BL emitted from the homogenizer optical system 33 is incident on the light separation and combination device 14.

The light separation and combination device 14 is a so-called prism-type polarization beam splitter, which allows one of P-polarized light and S-polarized light to pass therethrough, and reflects the rest of the P-polarized light and the S-polarized light. The light separation and combination device 14 includes prisms 141, 142 and the light separation and combination layer 143. The prisms 141, 142 are formed in a substantially triangular prism shape, each having an inclined surface having an angle of 45° with respect to the illumination optical axis Ax1, and an angle of 45° with respect to the illumination optical axis Ax2.

The light separation and combination layer 143 is provided at the inclined surface, and has a polarization separation function of separating the blue light BL in the first wavelength band incident on the light separation and combination layer 143 into the S-polarized light component and the P-polarized light component. The light separation and combination layer 143 reflects the S-polarized light component of the blue light BL and transmits the P-polarized light component of the blue light BL.

The light separation and combination layer 143 has a function of transmitting light in a second wavelength band (the green light LG and the red light LR) different from the first wavelength band (the wavelength band of the blue light BL) among the light incident on the light separation and combination layer 143 regardless of a polarization state thereof. The light separation and combination device 14 is not limited to a prism type, and a plate type polarization separation device may be used.

In the present embodiment, the blue light BL incident on the light separation and combination layer 143 has a polarization direction that matches the S-polarized light component, so that the blue light BL is reflected toward the wavelength conversion element 4 as S-polarized blue light (hereinafter, referred to as blue light BLs).

The retardation plate 15 is a quarter wavelength plate disposed in an optical path between the light separation and combination layer 143 and the wavelength conversion element 4. The blue light BLs, which is S-polarized light incident on the retardation plate 15, is converted into circularly polarized blue light BLc, and then is incident on the pickup optical system 16. The retardation plate 15 may be a half wavelength plate.

The pickup optical system 16 focuses the blue light BLc toward the wavelength conversion element 4. The pickup optical system 16 includes a lens 161 and a lens 162. Specifically, the pickup optical system 16 focuses a plurality of incident light beams (the blue light BLc) toward the wavelength conversion element 4 to be described below, and superimposes the plurality of light beams (the blue light BLc) on the wavelength conversion element 4.

The blue light BLc from the pickup optical system 16 is incident on the wavelength conversion element 4. The wavelength conversion element 4 is excited by part of the blue light BLc to generate a fluorescence YL including the red light and the green light. The fluorescence YL has a peak wavelength in a wavelength range of 500 nm to 700 nm. The configuration of the wavelength conversion element 4 will be described later. Part of the blue light BLc is reflected by the wavelength conversion element 4 as described later. In the present embodiment, the fluorescence YL corresponds to "light in the second wavelength band". Part of the fluorescence YL is also reflected by the wavelength conversion element 4.

The fluorescence YL emitted from the wavelength conversion element 4 and the blue light BLc reflected by the wavelength conversion element 4 pass through the pickup optical system 16 and the retardation plate 15 and are incident on the light separation and combination device 14. Here, the blue light BLc passes through the retardation plate 15 again to become P-polarized blue light BLp. The blue light BLp transmits the light separation and combination layer 143. The fluorescence YL transmits the light separation and combination layer 143. The fluorescence YL and the blue light BLp (the P-polarized blue light) are combined to generate the white illumination light WL. The illumination light WL is incident on the integrator optical system 17.

The integrator optical system 17 uniformizes the illuminance distribution in an illuminated region in cooperation with the superimposing lens 19 to be described later. The integrator optical system 17 includes a pair of lens arrays 171, 172. The pair of lens arrays 171, 172 are formed by arranging a plurality of lenses in an array. The illumination light WL emitted from the integrator optical system 17 is incident on the polarization conversion element 18.

The polarization conversion element 18 includes a polarization separation film and a retardation plate, and converts the illumination light WL into linearly polarized light. The illumination light WL emitted from the polarization conversion element 18 is incident on the superimposing lens 19.

The superimposing lens 19 superimposes the illumination light WL on the image formation region of each of the light modulation devices 400R, 400G, 400B to uniformize the illuminance distribution in the illuminated region. The image formation region is the illuminated region.

A configuration of the wavelength conversion element 4 will be described below.

As shown in FIG. 2, the wavelength conversion element includes a base material (a support substrate) 10, a wavelength conversion layer 11, a reflection member 12, a fixing member 13, a bonding member 23, and a heat dissipation member 26.

The base material 10 has a front surface 10a on a pickup optical system 16 side and a back surface 10b facing away from the front surface 10a. On the base material 10, a wavelength conversion layer 11 is provided at a front surface 10a side, and a heat dissipation member 26 is provided at a back surface 10b side.

In the present embodiment, a material having high thermal conductivity and excellent heat dissipation property may be used as the material of the base material 10. Examples of the material include metals such as aluminum and copper, and ceramics such as aluminum nitride, alumina, sapphire, and diamond.

The wavelength conversion layer 11 converts part of the incident light into the fluorescence YL and emits the fluorescence YL, and emits the other part of the incident light without converting the other part of the incident light into the fluorescence YL. In the present embodiment, the wavelength conversion layer 11 is formed of a phosphor obtained by firing phosphor particles. As the phosphor particles forming the wavelength conversion layer 11, a Yttrium Aluminum Garnet (YAG) phosphor containing Ce ions is used. A forming material of the phosphor particles may be one type, or a mixture of particles formed using two or more types of materials may be used. As the phosphor forming the wavelength conversion layer 11, a phosphor in which the phosphor particles are dispersed in an inorganic binder such as alumina, a phosphor formed by firing a glass binder which is an inorganic material and the phosphor particles, or the like may be used.

The heat dissipation member 26 is formed of, for example, a heat sink and has a structure having a plurality of fins. The heat dissipation member 26 is fixed to the back surface 10b of the base material 10 by, for example, performing bonding (metal bonding) using metal brazing. Since the wavelength conversion element 4 can dissipate heat from the wavelength conversion layer 11 via the heat dissipation member 26, heat deterioration of the wavelength conversion layer 11 can be prevented.

The reflection member 12 is provided between the front surface 10a of the base material 10 and the wavelength conversion layer 11. The reflection member 12 reflects the light incident from the wavelength conversion layer 11 toward the pickup optical system 16.

The reflection member 12 according to the present embodiment is formed of a multilayer film in which a plurality of films are stacked.

Figure 3:
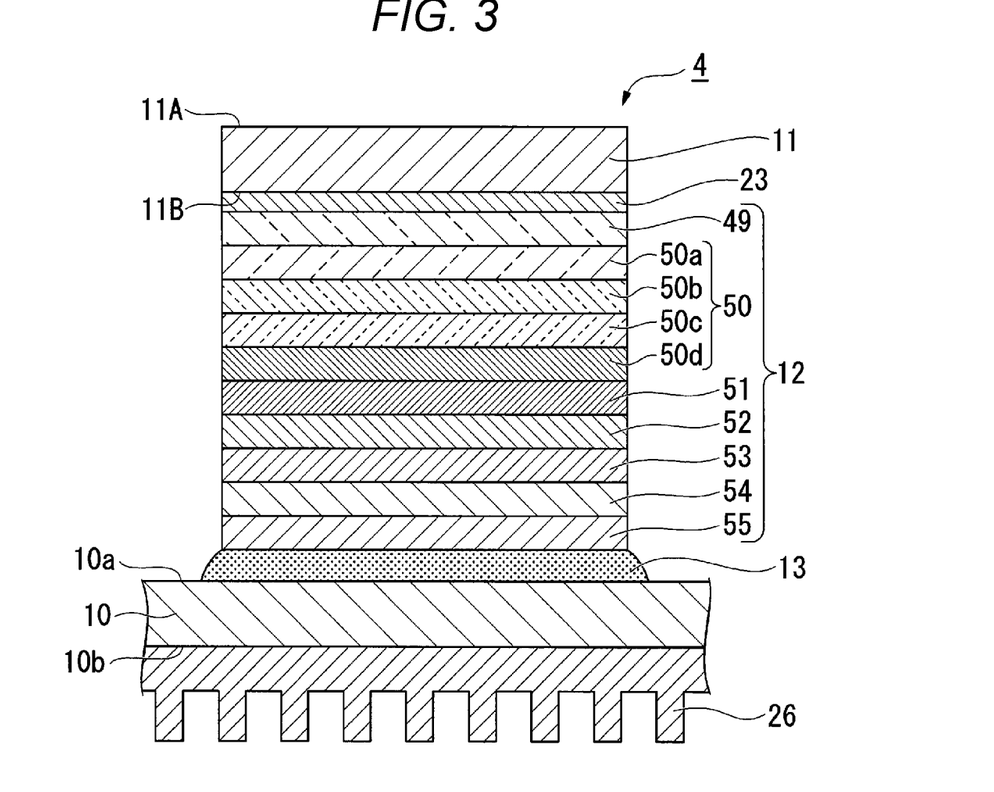
FIG. 3 is a cross-sectional view showing a main configuration of a wavelength conversion element.

FIG. 3 is a cross-sectional view showing a main configuration of the wavelength conversion element 4. Specifically, FIG. 3 is a view showing a cross section of the reflection member 12.

As shown in FIG. 3, the wavelength conversion layer 11 has a light exit surface 11A and a bottom surface (a first surface) 11B. The light exit surface 11A is a surface on which the blue light BLc is incident and the fluorescence YL is emitted in FIG. 2. The bottom surface 11B faces the base material 10.

The reflection member 12 is provided at a bottom surface 11B side of the wavelength conversion layer 11. In the wavelength conversion element 4 according to the present embodiment, the wavelength conversion layer 11 and the reflection member 12 are bonded via the bonding member 23. The configuration of the bonding member 23 will be described later.

In the wavelength conversion element 4 according to the present embodiment, the reflection member 12 is held on the front surface 10a of the base material 10 via the fixing member 13 (a third bonding layer). As a bonding method using the fixing member 13, for example, bonding (metal bonding) using metal brazing such as silver brazing can be used. Accordingly, the thermal conductivity between the reflection member 12 and the base material 10 can be improved. A sintered bonding material using nano Ag particles may be used as the fixing member 13.

The reflection member 12 according to the present embodiment includes a bonding auxiliary layer 55, a first adhesion layer 54, a first protective layer 53, a reflective layer 52, a second protective layer 51, a multilayer film 50, and a second adhesion layer 49, which are sequentially stacked from the front surface 10a side of the base material 10 toward the bottom surface 11B side of the wavelength conversion layer 11.

The bonding auxiliary layer 55 improves bonding reliability of the fixing member 13. If, for example, an Ag layer is used as the bonding auxiliary layer 55, the thermal conductivity between the reflection member 12 and the base material 10 can be improved.

The first adhesion layer 54 is a film that improves the adhesion between the bonding auxiliary layer 55 and the first protective layer 53, and is formed of, for example, a Ni layer.

The first adhesion layer 54 prevents the bonding auxiliary layer 55 from being oxidized when the first protective layer 53 that protects the reflective layer 52 is formed. The first adhesion layer 54 is provided between the bonding auxiliary layer 55 and the first protective layer 53. Since the first adhesion layer 54 formed of the Ni layer and the bonding auxiliary layer 55 formed of the Ag layer share free electrons, strong adhesion force can be attained.

The first protective layer 53 has a function of protecting the reflective layer 52. The first protective layer 53 is formed of, for example, $SnO_2$. The first protective layer 53 is provided between the first adhesion layer 54 and the reflective layer 52. The first protective layer 53 formed of the $SnO_2$ layer and the first adhesion layer 54 formed of the Ni layer have strong adhesion.

The reflective layer 52 is a layer that reflects the blue light BLc or the fluorescence YL incident on the reflection member 12. For example, Ag or Al is used as the material of the reflective layer 52. In the present embodiment, the reflective layer 52 is formed using the Ag layer having higher reflectance. The reflective layer 52 is provided between the first protective layer 53 and the second protective layer 51. The reflective layer 52 formed of the Ag layer and the first protective layer 53 formed of the $SnO_2$ layer have strong adhesion.

The second protective layer 51, which is similar to the first protective layer 53, is a layer having a function of protecting the reflective layer 52. The first protective layer 53 and the second protective layer 51 are formed of, for example, $SnO_2$. The second protective layer 51 is provided between the reflective layer 52 and a reflection enhancing layer 50d of the multilayer film 50 to be described later. The second protective layer 51 is thinner than the first protective layer 53. Therefore, when the second protective layer 51 is formed, the reflective layer 52 is not likely to be oxidized, so that it is not necessary to provide the Ni layer such as the first adhesion layer 54 between the reflective layer 52 and the second protective layer 51. The second protective layer 51 formed of the $SnO_2$ layer and the reflective layer 52 formed of the Ag layer have strong adhesion.

The multilayer film 50 is a layer containing an inorganic oxide and includes reflection enhancing layers 50a, 50b, 50c, 50d. The reflection enhancing layers 50a, 50b, 50c, 50d have an enhanced reflection effect and improve extraction efficiency of the fluorescence YL. In the present embodiment, for example, $Nb_2O_5$, $SiO_2$, $Nb_2O_5$, and $Al_2O_3$ are used as materials for forming the reflection enhancing layers 50a, 50b, 50c, 50d, respectively.

The reflection enhancing layer 50d formed of the $Al_2O_3$ layer is provided between the second protective layer 51 and the reflection enhancing layer 50c. The reflection enhancing layer 50c formed of the $Nb_2O_5$ layer is provided between the reflection enhancing layer 50d and the reflection enhancing layer 50b. The reflection enhancing layer 50b formed of the $SiO_2$ layer is provided between the reflection enhancing layer 50c and the reflection enhancing layer 50a. The reflection enhancing layer 50a formed of the $Nb_2O_5$ layer is provided between the reflection enhancing layer 50b and the second adhesion layer 49 formed of the $SiO_2$ layer.

Since the reflection enhancing layer 50d formed of the $Al_2O_3$ layer and the second protective layer 51 formed of the $SnO_2$ layer share oxygen atoms, a strong adhesion force can be attained. Since the reflection enhancing layer 50c formed of the $Nb_2O_5$ layer and the reflection enhancing layer 50d formed of the $Al_2O_3$ layer share oxygen atoms, a strong adhesion force can be attained. Since the reflection enhancing layer 50b formed of the $SiO_2$ layer and the reflection enhancing layer 50c formed of the $Nb_2O_5$ layer share oxygen atoms, a strong adhesion force can be attained. Since the reflection enhancing layer 50a formed of the $Nb_2O_5$ layer and the reflection enhancing layer 50b formed of the $SiO_2$ layer share oxygen atoms, a strong adhesion force can be attained.

The second adhesion layer 49 is an inorganic oxide layer for improving the bondability and adhesion between the bonding member 23 to be described later and the multilayer film 50, and is formed of, for example, the $SiO_2$ layer.

The second adhesion layer 49 is provided between the bonding member 23 to be described later and the reflection enhancing layer 50a formed of the $Nb_2O_5$ layer. Since the second adhesion layer 49 formed of the $SiO_2$ layer and the reflection enhancing layer 50a formed of the $Nb_2O_5$ layer share oxygen atoms, a strong adhesion force can be attained.

Figure 4:
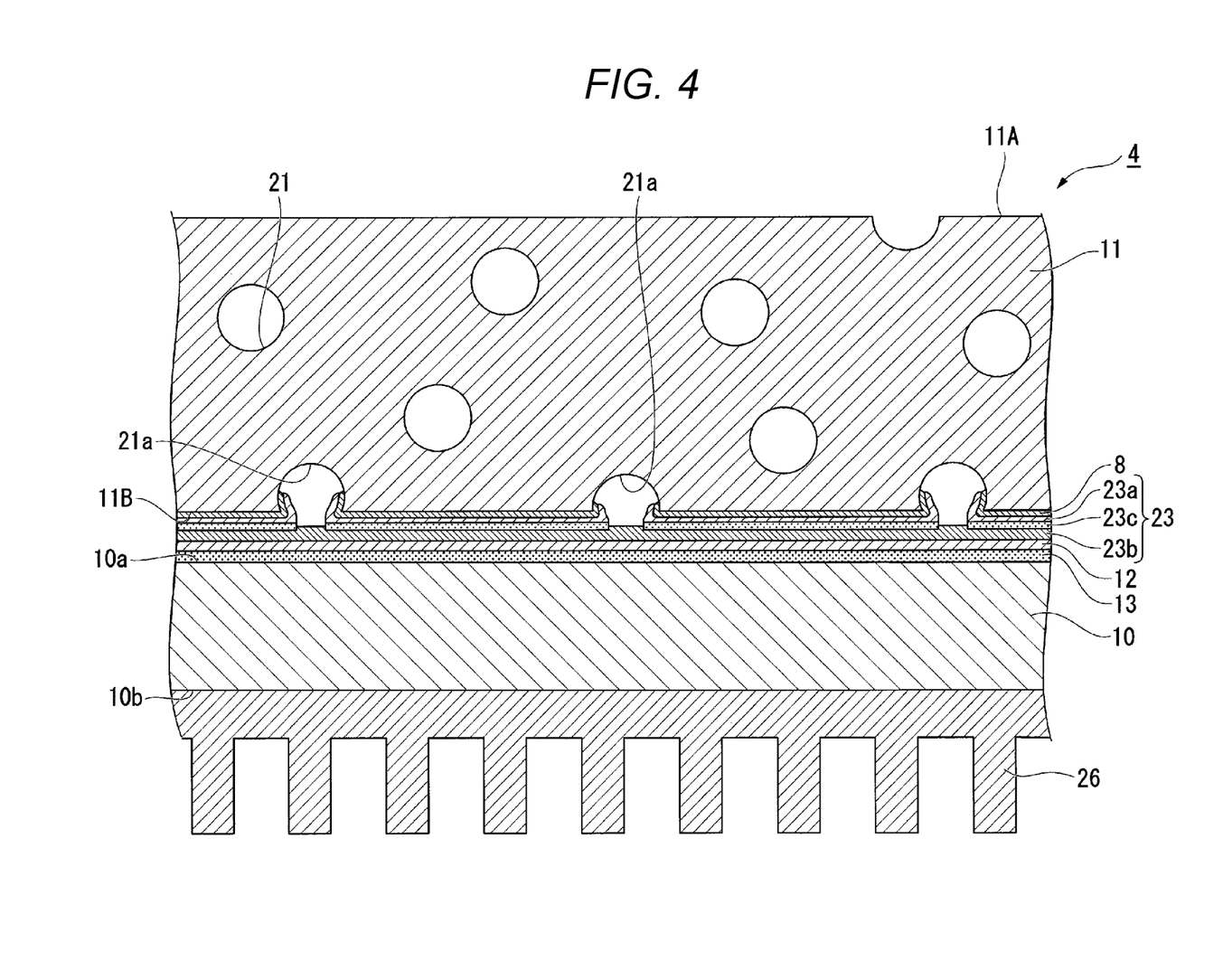
FIG. 4 is a cross-sectional view showing a main configuration of a wavelength conversion element.

FIG. 4 is a cross-sectional view showing a main configuration of the wavelength conversion layer 11. In FIG. 4, the reflection member 12 is simplified and shown as a single-layer member.

As shown in FIG. 4, in the present embodiment, the wavelength conversion layer 11 has a plurality of pores 21 formed therein. Accordingly, the wavelength conversion layer 11 has light scattering characteristics by the plurality of pores 21. The plurality of pores 21 are, for example, pores having an average diameter of approximately 60 μm.

A part of the plurality of pores 21 is exposed to the bottom surface 11B of the wavelength conversion layer 11. The wavelength conversion layer 11 has recesses 21a formed at the bottom surface 11B. The recess 21a is formed of a part of the pores 21 exposed on the bottom surface 11B. The wavelength conversion element 4 according to the present embodiment includes the bonding member 23 provided at the bottom surface 11B. The bonding member 23 is a member that bonds the wavelength conversion layer 11 and the reflection member 12.

The bonding member 23 includes a first bonding layer 23a and a second bonding layer 23b bonded to the first bonding layer 23a. In the present embodiment, the first bonding layer 23a and the second bonding layer 23b are formed of a plasma polymerized film. Examples of a constituent material of the first bonding layer 23a and the second bonding layer 23b include a material containing a siloxane bond and having a Si skeleton and a leaving group formed of an organic group bonded to the Si skeleton, such as a polymer containing the siloxane bond such as polyorganosiloxane. The first bonding layer 23a and the second bonding layer 23b may be formed of the same material or may be formed of different materials as long as the first bonding layer 23a and the second bonding layer 23b contain the siloxane bond. In the present embodiment, a refractive index of the first bonding layer 23a of the bonding member 23 facing the wavelength conversion layer 11 is lower than a refractive index of the wavelength conversion layer 11.

The first bonding layer 23a and the second bonding layer 23b that are formed of the plasma polymerized film have a property of being activated and exhibiting adhesiveness when energy is applied by plasma irradiation or the like. Therefore, the bonding member 23 can chemically bond the first bonding layer 23a and the second bonding layer 23b without using an adhesive or the like by utilizing the adhesiveness exhibited by the energy irradiation. The bonding member 23 has a bonding interface 23c chemically bonded between the first bonding layer 23a and the second bonding layer 23b. Since the methyl group of the siloxane bond is cleaved during an activation process of the first bonding layer 23a and the second bonding layer 23b, the methyl group contained in the bonding interface 23c is relatively smaller in content than the methyl group contained in the first bonding layer 23a and the second bonding layer 23b. The adhesion between the first bonding layer 23a and the second bonding layer 23b via the bonding interface 23c is fairly strong. Therefore, the bonding force between the first bonding layer 23a and the second bonding layer 23b is fairly strong, and the wavelength conversion layer 11 and the reflection member 12 are strongly bonded to each other by the bonding member 23.

The wavelength conversion layer 11 according to the present embodiment includes an adhesion auxiliary film 8 provided at the bottom surface 11B. The adhesion auxiliary film 8 is a film for improving the adhesion of the wavelength conversion layer 11 to the bonding member 23, and is formed of, for example, a $SiO_2$ film obtained by sintering polysilazane. The adhesion auxiliary film 8 is formed at the bottom surface 11B so as to enter the recess 21a.

The first bonding layer 23a is formed at the bottom surface 11B of the wavelength conversion layer 11 via the adhesion auxiliary film 8. The adhesion auxiliary film 8 may be omitted as necessary. When the adhesion auxiliary film 8 is omitted, the first bonding layer 23a is formed directly on the bottom surface 11B.

A part of the first bonding layer 23a is formed in the recess 212a. Since the first bonding layer 23a is formed to enter the recess 21a, the adhesion to the wavelength conversion layer 11 is enhanced by an anchor effect. Therefore, the first bonding layer 23a is not likely to peel off from the wavelength conversion layer 11. The adhesion of the first bonding layer 23a to the wavelength conversion layer 11 is further enhanced by the adhesion auxiliary film 8 formed of the $SiO_2$ film.

The second bonding layer 23b is bonded to the first bonding layer 23a so as to cover the recess 21a, thereby forming the bonding member 23 including the first bonding layer 23a and the second bonding layer 23b. The reflection member 12 is formed at an opposite side of the second bonding layer 23b from the first bonding layer 23a.

Since the first bonding layer 23a forming a bonding part with the wavelength conversion layer 11 is not likely to peel off from the wavelength conversion layer 11, the bonding member 23 according to the embodiment has excellent adhesion to the wavelength conversion layer 11. The second bonding layer 23b improves the adhesion to the multilayer film 50 by the second adhesion layer 49 formed of the $SiO_2$ layer. Therefore, the reflection member 12 bonded to the wavelength conversion layer 11 via the bonding member 23 is not likely to peel off from the wavelength conversion layer 11, and the reflection member 12 is in a state of being favorably adhered to the wavelength conversion layer 11.

The wavelength conversion element 4 according to the present embodiment is manufactured, for example, using the following manufacturing method.

First, the wavelength conversion layer 11 is prepared (a preparation step).

Figure 5A:
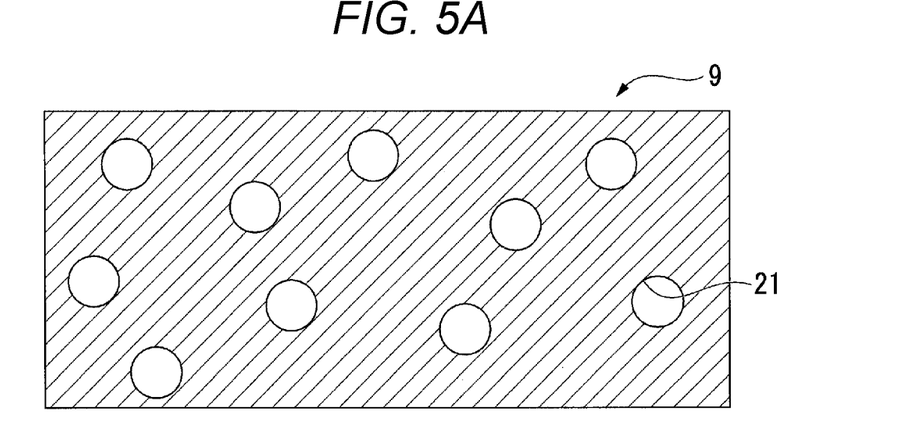
FIG. 5A is a diagram showing a manufacturing step of the wavelength conversion element.

First, a mixture containing the phosphor particles and the like constituting the wavelength conversion layer 11 is adjusted, and the mixture is fired at a predetermined temperature. By firing, as shown in FIG. 5A, a phosphor base material 9 that includes the plurality of pores 21 and is formed of a phosphor is formed. The size or number of the pores 21 can be adjusted by the firing temperature or a material of a substance added to the mixture.

Figure 5B:
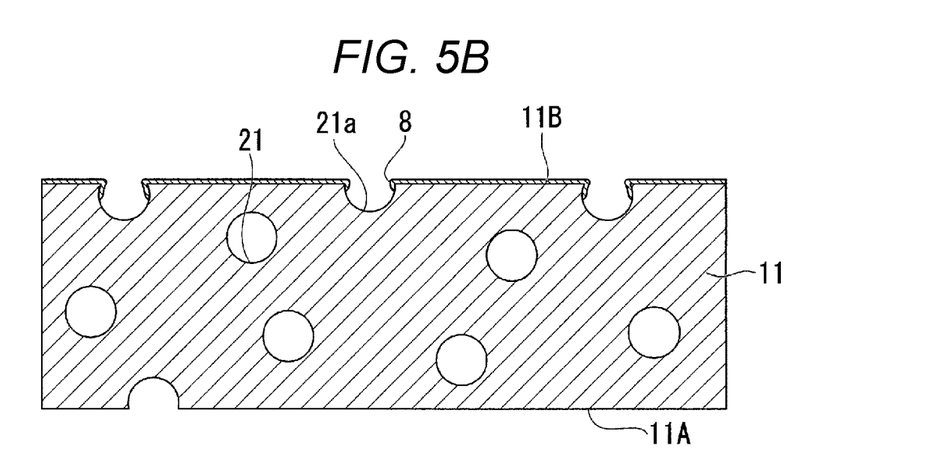
FIG. 5B is a diagram showing a manufacturing step of the wavelength conversion element.

Subsequently, both surfaces of the phosphor base material 9 are polished to form the wavelength conversion layer 11 having the light exit surface 11A and the bottom surface 11B as shown in FIG. 5B. A part of the pores 21 is exposed to the outside by polishing, and the recesses 21a are formed at the bottom surface 11B of the wavelength conversion layer 11. Then, the SiO$_2$ film that forms the adhesion auxiliary film 8 is formed using a dry process such as vapor deposition or CVD at the bottom surface 11B. In the present embodiment, the adhesion auxiliary film 8 is formed using CVD. The SiO$_2$ film may be formed using a wet process.

Figure 5C:
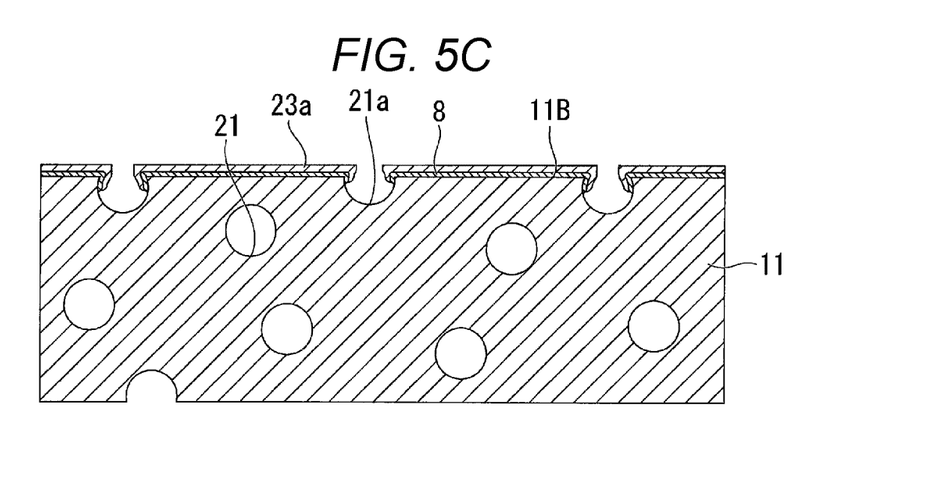
FIG. 5C is a diagram showing a manufacturing step of the wavelength conversion element.

Subsequently, as shown in FIG. 5C, the first bonding layer 23a is formed at the bottom surface 11B of the wavelength conversion layer 11 so that a part of the first bonding layer 23a is formed in the recess 21a (a first step). In the first step, the first bonding layer 23a is formed so that a part of the first bonding layer 23a enters the recess 212a.

In the present embodiment, the first bonding layer 23a is formed using a material having a lower refractive index than the wavelength conversion layer 11. Specifically, the first bonding layer 23a is formed by using a plasma polymerization method and forming a material such as polyorganosiloxane. The material contains a siloxane bond, and has a Si skeleton and a leaving group that is formed of an organic group bonded to the Si skeleton. The first bonding layer 23a formed using the plasma polymerization method is formed in a state in which a part of the first bonding layer 23a enters the recess 212a.

In the present embodiment, since the wavelength conversion layer 11 includes the adhesion auxiliary film 8 provided at the bottom surface 11B, the first bonding layer 23a and the wavelength conversion layer 11 have high bondability and adhesion. Since the first bonding layer 23a is formed to enter the recess 21a, the adhesion to the wavelength conversion layer 11 is enhanced by the anchor effect. According to the present embodiment, since the first bonding layer 23a is formed using a material having a lower refractive index than the wavelength conversion layer 11, total reflection can be performed at an interface between the wavelength conversion layer 11 and the first bonding layer 23a.

Figure 6A:
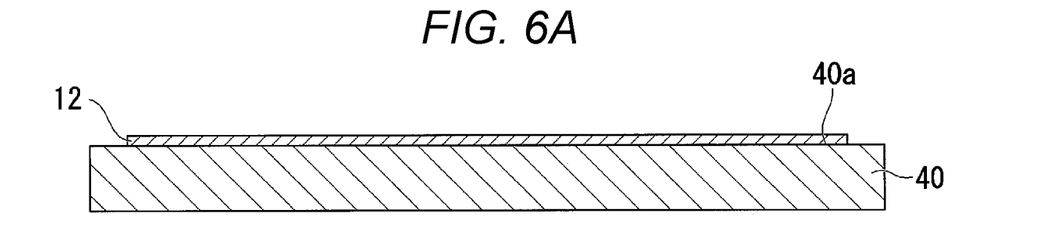
FIG. 6A is a diagram showing a manufacturing step of the wavelength conversion element.

Subsequently, as shown in FIG. 6A, the reflection member 12 is formed at a front surface (a second surface) 40a of a transfer substrate (a substrate) 40 (a second step). Specifically, a sapphire substrate is used as the transfer substrate 40. The front surface 40a of the transfer substrate 40 is a mirror surface.

The reflection member 12 is formed by sequentially forming each layer of the reflection member 12 shown in FIG. 3 on the front surface 40a of the transfer substrate 40 by vapor deposition, sputtering, or the like. That is, on the front surface 40a of the transfer substrate 40, the reflection member 12 is formed by sequentially forming the bonding auxiliary layer 55, the first adhesion layer 54, the first protective layer 53, the reflective layer 52, the second protective layer 51, the reflection enhancing layer 50d of the multilayer film 50, the reflection enhancing layer 50c of the multilayer film 50, the reflection enhancing layer 50b of the multilayer film 50, the reflection enhancing layer 50a of the multilayer film 50, and the second adhesion layer 49. The reflection member 12 is uniformly formed on the front surface 40a of the transfer substrate 40 which is a mirror surface. Using the method of manufacturing the wavelength conversion element 4 according to the present embodiment, the reflection member 12 can be uniformly formed.

Figure 6B:
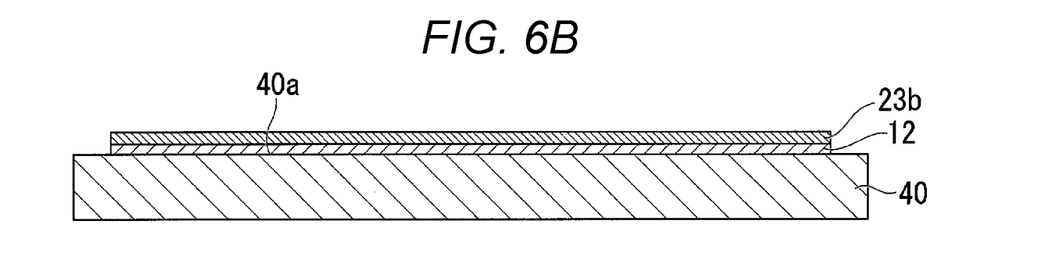
FIG. 6B is a diagram showing a manufacturing step of the wavelength conversion element.

Subsequently, as shown in FIG. 6B, the second bonding layer 23b is formed at the reflection member 12 (a third step). Specifically, the second bonding layer 23b is formed by using a plasma polymerization method and forming a material such as polyorganosiloxane. The material contains a siloxane bond, and has a Si skeleton and a leaving group that is formed of an organic group bonded to the Si skeleton. Since the second bonding layer 23b is formed on the highly uniform reflection member 12, the second bonding layer 23b itself is also a highly uniform film.

Figure 5D:
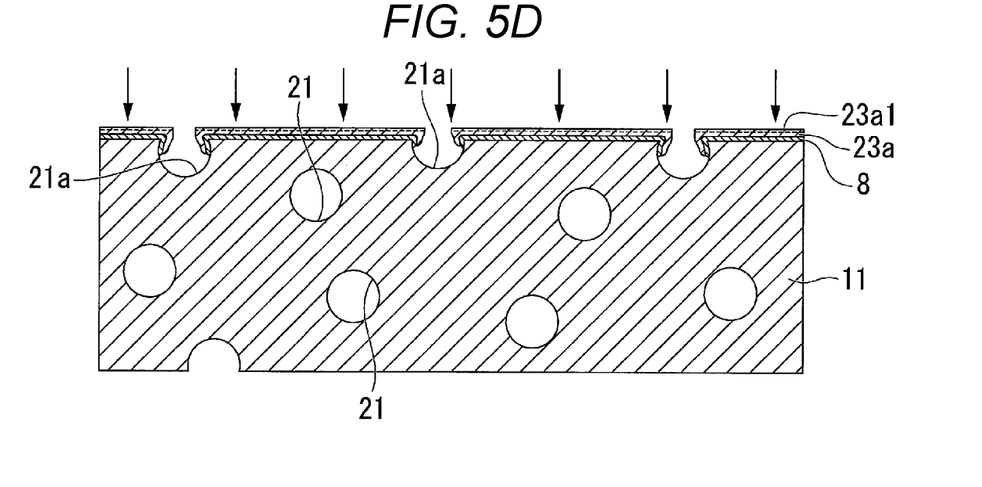
FIG. 5D is a diagram showing a manufacturing step of the wavelength conversion element.
Figure 6C:
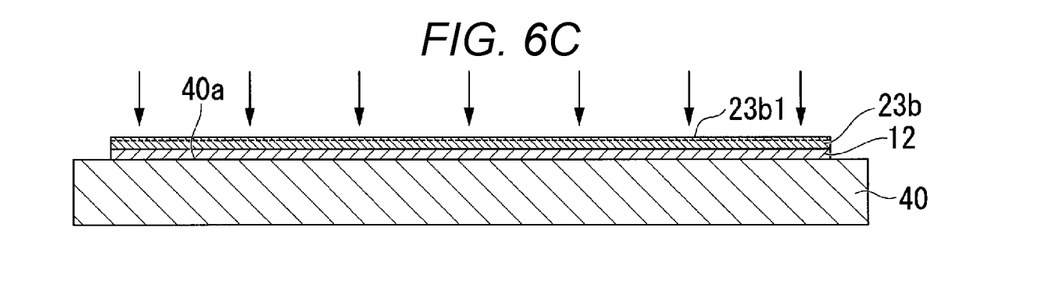
FIG. 6C is a diagram showing a manufacturing step of the wavelength conversion element.

Subsequently, as shown in FIG. 5D, energy is applied to a front surface 23a1 of the first bonding layer 23a (a fourth step). As shown in FIG. 6C, energy is applied to a front surface 23b1 of the second bonding layer 23b (the fourth step).

Specifically, the front surface 23a1 of the first bonding layer 23a and the front surface 23b1 of the second bonding layer 23b are activated by applying the energy generated by the plasma irradiation (the fourth step).

Figure 7A:
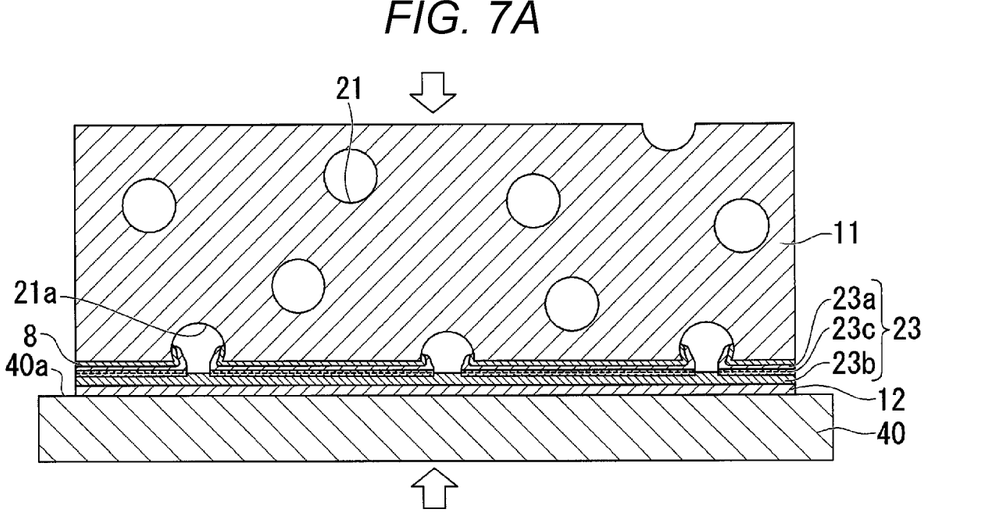
FIG. 7A is a diagram showing a manufacturing step of the wavelength conversion element.

Subsequently, as shown in FIG. 7A, the first bonding layer 23a and the second bonding layer 23b are opposed to each other, brought into contact with each other, and further pressed to bond the first bonding layer 23a and the second bonding layer 23b so that the recess 21a is covered with the second bonding layer 23b (a fifth step).

In the fifth step, the front surfaces 23a1, 23b1 are brought into close contact by pressing the first bonding layer 23a and the second bonding layer 23b. Since the methyl group of the siloxane bond is cleaved during the activation process of the front surfaces 23a1, 23b1 of the first bonding layer 23a and the second bonding layer 23b and the adhesiveness is exhibited, the first bonding layer 23a and the second bonding layer 23b are chemically bonded. In this manner, the bonding member 23 which includes the bonding interface 23c between the first bonding layer 23a and the second bonding layer 23b is formed (see FIG. 7A). Since the methyl group of the siloxane bond is cleaved during the activation process of the first bonding layer 23a and the second bonding layer 23b, the bonding interface 23c having a relatively small number of methyl groups is formed at a bonding part of the first bonding layer 23a and the second bonding layer 23b.

Figure 7B:
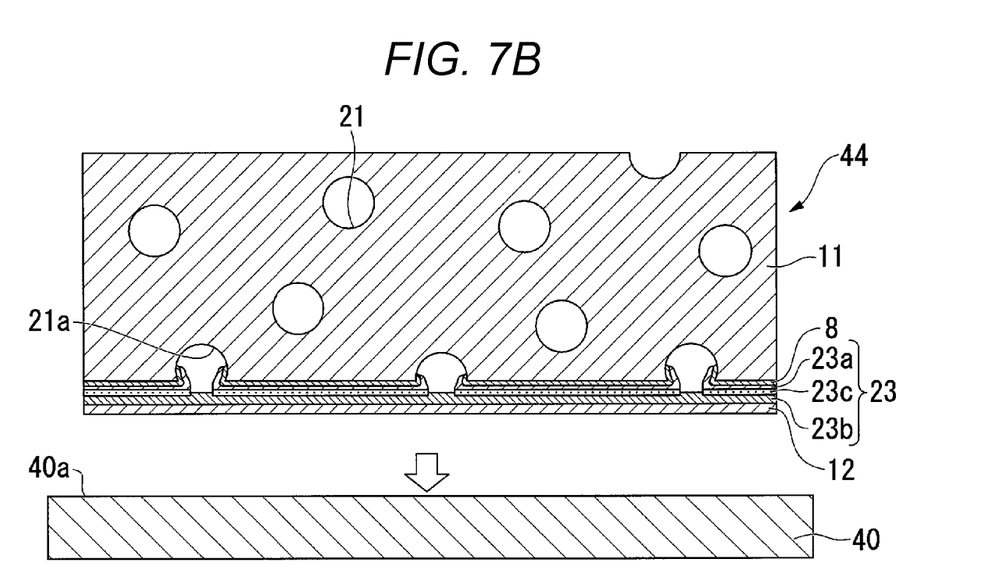
FIG. 7B is a diagram showing a manufacturing step of the wavelength conversion element.

Subsequently, as shown in FIG. 7B, the reflection member 12 and the transfer substrate 40 are separated (a sixth step).

In the present embodiment, the front surface 40a of the transfer substrate 40 is a mirror surface. An adhesion force between the front surface 40a of the transfer substrate 40 and the bonding auxiliary layer 55 of the reflection member 12 is the smallest as compared to the adhesion force between the layers of the reflection member 12 and the adhesion force of the bonding interface 23c of the bonding member 23. That is, the adhesion force between the bonding auxiliary layer 55 formed of the Ag layer and the transfer substrate 40 formed of sapphire is the smallest as compared with the adhesion force between the layers of the reflection member 12 and the adhesion force of the bonding interface 23c of the bonding member 23. Therefore, when the transfer substrate 40 is peeled off, peeling occurs at the interface between the bonding auxiliary layer 55 of the reflection member 12 having the smallest adhesion force and the transfer substrate 40, and the reflection member 12 can be transferred to a wavelength conversion layer 11 side. By peeling off the transfer substrate 40, a bonded body 44 including the wavelength conversion layer 11 and the reflection member 12 that are bonded by the first bonding layer 23a and the second bonding layer 23b is formed.

A peeling method of the transfer substrate 40 is not particularly limited, and, for example, a method of mechanically peeling, a method of peeling by generating thermal stress, or a method of peeling by forming a layer containing a deliquescent substance between the reflection member 12 and the transfer substrate 40 may be used.

Figure 7C:
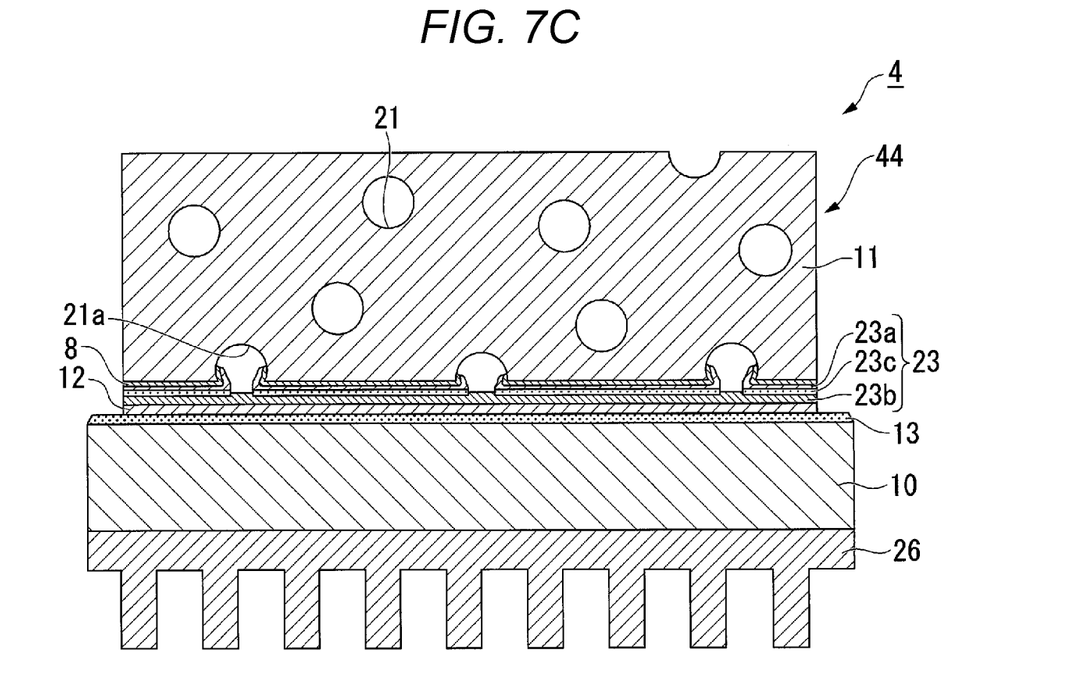
FIG. 7C is a diagram showing a manufacturing step of the wavelength conversion element.

Subsequently, as shown in FIG. 7C, the bonded body 44 and the front surface 10a of the base material 10 are bonded via the fixing member 13 (the third bonding layer) (a seventh step). Finally, the heat dissipation member 26 is fixed to the back surface 10b of the base material 10 to manufacture the wavelength conversion element 4 according to the present embodiment.

Effects of Embodiment

The wavelength conversion element 4 according to the present embodiment has the following effects.

The wavelength conversion element 4 according to the present embodiment includes the wavelength conversion layer 11 that is formed with the plurality of pores 21 and that is excited by the blue light BLc to generate the fluorescence YL, the first bonding layer 23a formed at the bottom surface 11B of the wavelength conversion layer 11, the second bonding layer 23b bonded to the first bonding layer 23a, and the reflection member 12 that is formed at the second bonding layer 23b and that reflects the blue light BLc and the fluorescence YL. The bottom surface 11B of the wavelength conversion layer 11 is formed with the recess 212a. A part of the first bonding layer 23a is formed at the recess 212a. The second bonding layer 23b is formed so as to cover the recess 212a. The first bonding layer 23a and the second bonding layer 23b are plasma polymerized films.

According to the wavelength conversion element 4 according to the present embodiment, since a part of the first bonding layer 23a enters the recess 21a, the adhesion of the first bonding layer 23a to the wavelength conversion layer 11 can be improved by the anchor effect. Therefore, since the first bonding layer 23a is not likely to peel off from the wavelength conversion layer 11, the reflection member 12 bonded to the first bonding layer 23a via the second bonding layer 23b is not likely to peel off from the wavelength conversion layer 11. Therefore, according to the wavelength conversion element 4 according to the present embodiment, peeling of the reflection member 12 from the wavelength conversion layer 11 can be prevented, and the reliability of the reflection member 12 can be improved.

Since the wavelength conversion element 4 according to the present embodiment includes the second bonding layer 23b formed so as to cover the recess 21a, a manufacturing step of bonding the second bonding layer 23b including the reflection member 12 manufactured in a separate step to the first bonding layer 23a formed on the bottom surface 11B of the wavelength conversion layer 11 can be adopted. The reflection member 12 is formed by forming a plurality of layers. Here, since flatness of the bottom surface 11B having the recess 21a is low, if the reflection member 12 is formed directly at the bottom surface 11B of the wavelength conversion layer 11, it is difficult to satisfactorily form each layer constituting the reflection member 12, and the flatness of the reflection member 12 is deteriorated. If the flatness of the reflection member 12 is deteriorated, the fluorescence YL cannot be efficiently reflected, and the extraction efficiency of the fluorescence YL is reduced.

On the other hand, since the wavelength conversion element 4 according to the present embodiment has a configuration in which the reflection member 12 having high flatness manufactured in the separate step is bonded to the first bonding layer 23a by the second bonding layer 23b, it is possible to efficiently reflect the fluorescence YL and improve the extraction efficiency of the fluorescence YL.

In the wavelength conversion element 4 according to the present embodiment, since the first bonding layer 23a and the second bonding layer 23b that are formed of the plasma polymerized film can be bonded without using the adhesive, light resistance in the bonded part is improved as compared with that when the adhesive or the like is used. Therefore, a wavelength conversion element excellent in bonding reliability between the wavelength conversion layer 11 and the reflection member 12 is provided.

The wavelength conversion element 4 according to the present embodiment includes the base material 10, and the fixing member 13 that bonds the base material 10 and the reflection member 12.

According to this configuration, heat can be released from the reflection member 12 to the base material 10 via the fixing member 13. Therefore, since the thermal conductivity between the reflection member 12 and the base material 10 is improved, the heat can be dissipated from the wavelength conversion layer 11 via the reflection member 12. Therefore, heat deterioration of the wavelength conversion layer 11 can be prevented.

In the wavelength conversion element 4 according to the present embodiment, the refractive index of the first bonding layer 23a is lower than that of the wavelength conversion layer 11.

According to this configuration, total reflection can be used at the interface between the wavelength conversion layer 11 and the first bonding layer 23a. Therefore, use efficiency of light can be improved.

The method of manufacturing the wavelength conversion element 4 according to the present embodiment includes: a preparation step of preparing the wavelength conversion layer 11 that has the plurality of pores 21, the bottom surface 11B, and the recess 21a formed in the bottom surface 11B, and that is excited by the blue light BLc to generate the fluorescence YL; a first step of forming the first bonding layer 23a at the bottom surface 11B of the wavelength conversion layer 11; a second step of forming the reflection member 12 at the front surface 40a of the transfer substrate 40; a third step of forming the second bonding layer 23b at the reflection member 12; a fourth step of applying energy to the first bonding layer 23a and the second bonding layer 23b; a fifth step of pressing the first bonding layer 23a and the second bonding layer 23b, and bonding the first bonding layer 23a and the second bonding layer 23b so that the recess 21a is covered by the second bonding layer 23b; and a sixth step of separating the reflection member 12 and the transfer substrate 40. In the first step, a part of the first bonding layer 23a is formed in the recess 212a.

According to the method of manufacturing the wavelength conversion element 4 according to the present embodiment, since a part of the first bonding layer 23a enters the recess 21a in the first step, the adhesion of the first bonding layer 23a to the wavelength conversion layer 11 is improved by the anchor effect. Therefore, since the first bonding layer 23a is not likely to peel off from the wavelength conversion layer 11, the reflection member 12 bonded to the first bonding layer 23a via the second bonding layer 23b is not likely to peel off from the wavelength conversion layer 11. Therefore, using the method of manufacturing the wavelength conversion element 4 according to the present embodiment, it is possible to provide a wavelength conversion element that prevents the peeling of the reflection member 12 from the wavelength conversion layer 11 and improves the reliability of the reflection member 12.

Here, since the flatness of the bottom surface 11B formed with the recess 21a is low, when the reflection member is directly formed at the bottom surface 11B of the wavelength conversion layer 11, the flatness of the reflection member 12 is deteriorated, the fluorescence YL cannot be efficiently reflected, and the extraction efficiency of the fluorescence YL is reduced.

On the other hand, in the method of manufacturing the wavelength conversion element 4 according to the present embodiment, the second bonding layer 23b can be bonded to the first bonding layer 23a so as to cover the recess 21a, and the reflection member 12 can be transferred to the wavelength conversion layer 11. That is, in the method of manufacturing the wavelength conversion element 4 according to the present embodiment, since the reflection member 12 is formed at the front surface 40a of the transfer substrate 40 having no recess 21a and then is bonded to the wavelength conversion layer 11, it is possible to prevent the occurrence of defects in the reflection member 12 due to the recess 212a. Therefore, by improving the flatness of the reflection member 12, a decrease in the reflectance of the reflection member 12 is prevented, the fluorescence YL can be efficiently reflected, and the extraction efficiency of the fluorescence YL can be improved.

In the method of manufacturing the wavelength conversion element 4 according to the present embodiment, since the first bonding layer 23a and the second bonding layer 23b can be bonded by intermolecular bonding without using the adhesive, the light resistance in the bonded part is improved as compared with that when the adhesive or the like is used. Therefore, the wavelength conversion element 4 having excellent bonding reliability between the wavelength conversion layer 11 and the reflection member 12 can be provided.

The method of manufacturing the wavelength conversion element 4 according to the present embodiment further includes, after the sixth step, a seventh step of bonding the bonded body 44 and the base material 10 via the fixing member 13. The bonded body 44 is obtained by bonding the wavelength conversion layer 11 and the reflection member 12 by the first bonding layer 23a and the second bonding layer 23b.

According to this configuration, a structure can be obtained in which the heat is released from the reflection member 12 to the base material 10 via the fixing member 13. Therefore, since the thermal conductivity between the reflection member 12 and the base material 10 is improved, the heat of the wavelength conversion layer 11 can be released via the reflection member 12. Therefore, the heat deterioration of the wavelength conversion layer 11 is prevented, so that the wavelength conversion element 4 having high reliability can be provided.

In the method of manufacturing the wavelength conversion element 4 according to the present embodiment, in the first step, the first bonding layer 23a is formed using a material having a lower refractive index than the wavelength conversion layer 11.

According to this configuration, it is possible to manufacture the wavelength conversion element 4 that uses total reflection at the interface between the wavelength conversion layer 11 and the first bonding layer 23a. Therefore, the wavelength conversion element 4 having high light use efficiency is provided.

The light source device 100A according to the present embodiment includes the wavelength conversion element described above and a light source that emits light in the first wavelength band toward the wavelength conversion element.

Since the light source device 100A according to the present embodiment includes the wavelength conversion element 4 in which the peeling of the reflection member 12 is prevented, a highly reliable light source device can be provided.

The projector 1 according to the present embodiment includes the light source device 100A, the light modulation devices 400R, 400G, 400B that form image light by modulating light from the light source device 100A according to image information, and the projection optical system 600 that projects image light.

Since the projector 1 according to the present embodiment includes the illumination device 100 using the light source device 100A, the projector 1 also has excellent reliability.

The present disclosure is not limited to the contents of the above embodiment, and can be appropriately modified without departing from the gist of the disclosure.

For example, in the above embodiment, the fixed type wavelength conversion element 4 is used as an example, and the wavelength conversion element according to the present disclosure can also be applied to a rotary wheel type. By applying the wavelength conversion element to the rotary wheel type, the heat dissipation property of the wavelength conversion layer is improved and the fluorescence emission efficiency is improved, so that the amount of light emitted from the wavelength conversion element 4 can be improved.

In the above embodiment, an over-type liquid crystal light valve is used as the light modulation device, and a reflective liquid crystal light valve can also be used as the light modulation device. As the light modulation device, an optical modulation device other than liquid crystal may be used, such as a device using a micro mirror, for example, a device using a digital micromirror device (DMD). Further, as the light source of the illumination device, not only a semiconductor laser diode but also a light emitting diode (LED) can be used.

In the above embodiment, the light source device according to the present disclosure is mounted on a projector-used illumination device, and the present disclosure is not limited thereto. The light source device according to the present disclosure can also be applied to a luminaire, a headlight of an automobile, and the like.

In the above embodiment, the Ni layer may be provided between the second protective layer 51 and the reflective layer 52. The Ni layer can prevent oxidation of the reflective layer 52 when the second protective layer 51 is formed.

In the above embodiment, the Ni layer may be provided between the reflective layer 52 and the first protective layer 53. The Ni layer can prevent the reflective layer 52 from deteriorating.

The wavelength conversion element according to an aspect of the present disclosure includes: a wavelength conversion layer that is formed with a plurality of pores and that is excited by light in a first wavelength band to generate light in a second wavelength band different from the light in the first wavelength band; a first bonding layer formed at a first surface of the wavelength conversion layer; a second bonding layer bonded to the first bonding layer; and a reflection member that is formed at the second bonding layer and that reflects the light in the first wavelength band or the light in the second wavelength band. The first surface of the wavelength conversion layer is formed with a recess. A part of the first bonding layer is formed at the recess. The second bonding layer is formed to cover the recess. The first bonding layer and the second bonding layer are plasma polymerized films.

The wavelength conversion element according to the above aspect may include a support substrate, and a third bonding layer that bonds the support substrate and the reflection member.

In the wavelength conversion element according to the above aspect, a refractive index of the first bonding layer may be lower than a refractive index of the wavelength conversion layer.

A method of manufacturing a wavelength conversion element according to an aspect of the present disclosure includes: a preparation step of preparing a wavelength conversion layer that has a plurality of pores, a first surface, and a recess formed at the first surface and that is excited by light in a first wavelength band to generate light in a second wavelength band different from the light in the first wavelength band; a first step of forming a first bonding layer at the first surface of the wavelength conversion layer; a second step of forming a reflection member at a second surface of a substrate; a third step of forming a second bonding layer at the reflection member; a fourth step of applying energy to the first bonding layer and the second bonding layer; a fifth step of pressing the first bonding layer and the second bonding layer, and bonding the first bonding layer and the second bonding layer so that the recess is covered by the second bonding layer; and a sixth step of separating the reflection member and the substrate. In the first step, a part of the first bonding layer is formed in the recess.

The method of manufacturing a wavelength conversion element according to the above aspect may further include, after the sixth step, a seventh step of bonding a bonded body and a support substrate via the third bonding layer. The bonded body is obtained by bonding the wavelength conversion layer and the reflection member by the first bonding layer and the second bonding layer.

In the method of manufacturing the wavelength conversion element according to the above aspect, in the first step, the first bonding layer may be formed using a material having a lower refractive index than the wavelength conversion layer.

A light source device according to an aspect of the present disclosure includes the wavelength conversion element according to the above aspect and a light source that emits light in the first wavelength band toward the wavelength conversion element.

A projector according to an aspect of the present disclosure includes the light source device according to the above aspect, a light modulation device that forms image light by modulating light from the light source device according to image information, and a projection optical system that projects the image light.

What is claimed is:

1. A wavelength conversion element comprising:
   a wavelength conversion layer that is formed with a plurality of pores and that is excited by light in a first wavelength band to generate light in a second wavelength band different from the light in the first wavelength band;
   a first bonding layer formed at a first surface of the wavelength conversion layer;
   a second bonding layer bonded to the first bonding layer; and
   a reflection member that is formed at the second bonding layer and that reflects the light in the first wavelength band or the light in the second wavelength band, wherein
   the first surface of the wavelength conversion layer is formed with a recess,
   a part of the first bonding layer is formed at the recess,
   the second bonding layer is formed so as to cover the recess, and
   the first bonding layer and the second bonding layer are plasma polymerized films.

2. The wavelength conversion element according to claim 1, further comprising:
   a support substrate; and
   a third bonding layer that bonds the support substrate and the reflection member.

3. The wavelength conversion element according to claim 2, wherein
   a refractive index of the first bonding layer is lower than a refractive index of the wavelength conversion layer.

4. A light source device comprising:
   the wavelength conversion element according to claim 3; and
   a light source that emits the light in the first wavelength band toward the wavelength conversion element.

5. A projector comprising:
   the light source device according to claim 4;
   a light modulation device that forms image light by modulating light from the light source device according to image information; and
   a projection optical system that projects the image light.

6. A light source device comprising:
   the wavelength conversion element according to claim 2; and
   a light source that emits the light in the first wavelength band toward the wavelength conversion element.

7. A projector comprising:
   the light source device according to claim 6;
   a light modulation device that forms image light by modulating light from the light source device according to image information; and
   a projection optical system that projects the image light.

8. The wavelength conversion element according to claim 1, wherein
   a refractive index of the first bonding layer is lower than a refractive index of the wavelength conversion layer.

9. A light source device comprising:
   the wavelength conversion element according to claim 8; and
   a light source that emits the light in the first wavelength band toward the wavelength conversion element.

10. A projector comprising:
    the light source device according to claim 9;
    a light modulation device that forms image light by modulating light from the light source device according to image information; and
    a projection optical system that projects the image light.

11. A light source device comprising:
    the wavelength conversion element according to claim 1; and
    a light source that emits the light in the first wavelength band toward the wavelength conversion element.

12. A projector comprising:
    the light source device according to claim 11;
    a light modulation device that forms image light by modulating light from the light source device according to image information; and
    a projection optical system that projects the image light.

13. A method of manufacturing a wavelength conversion element, the method comprising:

a preparation step of preparing a wavelength conversion layer that has a plurality of pores, a first surface, and a recess formed at the first surface and that is excited by light in a first wavelength band to generate light in a second wavelength band different from the light in the first wavelength band;

a first step of forming a first bonding layer at the first surface of the wavelength conversion layer;

a second step of forming a reflection member at a second surface of a substrate;

a third step of forming a second bonding layer at the reflection member;

a fourth step of applying energy to the first bonding layer and the second bonding layer;

a fifth step of pressing the first bonding layer and the second bonding layer, and bonding the first bonding layer and the second bonding layer so that the recess is covered by the second bonding layer; and a sixth step of separating the reflection member and the substrate, wherein in the first step, a part of the first bonding layer is formed in the recess.

14. The method of manufacturing a wavelength conversion element according to claim 13, the method further comprising:

after the sixth step, a seventh step of bonding a bonded body and a support substrate via a third bonding layer, the bonded body being obtained by bonding the wavelength conversion layer and the reflection member by the first bonding layer and the second bonding layer.

15. The method of manufacturing the wavelength conversion element according to claim 14, wherein in the first step, the first bonding layer is formed using a material having a lower refractive index than the wavelength conversion layer.

16. The method of manufacturing the wavelength conversion element according to claim 13, wherein in the first step, the first bonding layer is formed using a material having a lower refractive index than the wavelength conversion layer.

* * * * *